United States Patent Office 2,827,462
Patented Mar. 18, 1958

2,827,462

WERNER COMPLEXES

William Smith Dorsey, Fullerton, and William D. Schaeffer, Ontario, Calif., assignors to Union Oil Company of California, Los Angeles, Calif., a corporation of California No Drawing. Application January 2, 1953
Serial No. 329,434

4 Claims. (Cl. 260—270)

This invention relates to a novel class of metal compounds which are highly soluble in hydrocarbon oils and other non-polar solvents. Broadly speaking the new compounds are coordinate complexes of the Werner type wherein the basic nitrogen component is an alkyl-substituted pyridine base containing more than 6 carbon atoms, and the anion consists of three or more atoms so combined as to produce the phenomenon known as "resonance stabilization," as e. g. thiocyanate.

The primary object of this invention is to provide means whereby large proportions of metals may be dissolved in non-polar solvents such as hydrocarbon oils, thereby providing stable solutions containing e. g. from 5% to 20% by weight of metal.

Another object is to provide oil-soluble complexes of metal salts and amines wherein the non-metallic constituents are non-corrosive.

Still another object is to provide a broad class of such oil-soluble, non-corrosive complexes which may be rapidly and easily prepared without expensive equipment or procedures.

Other objects will be apparent to those skilled in the art from the description which follows.

There exists in many industrial and chemical fields a need for metal compounds which are highly soluble in non-polar solvents, and which are stable, non-corrosive and cheaply prepared. Examples of such fields include lubricating oils, paints, solvents, thinners, rubber, plastics, insecticides, etc. The metal complexes described herein find use in these various fields, and in other fields, as oxidation accelerators, polymerization catalysts, anti-corrosive agents, insecticides, fungicides, radioactive tracers, etc.

Hydrocarbon solutions of the appropriate metal complexes may also be employed to impregnate solids with metals. This is particularly desirable when anhydrous impregnation conditions are desired, or when it is desired to impregnate a hydrophobic solid. It is often desired for example to impregnate activated carbon with metal compounds for catalytic purposes, and since that material is ordinarily hydrophobic, aqueous solutions of a metal salt tend to give uneven or non-intimate deposition of metal. By impregnating such materials with a hydrocarbon solution of the desired metal complex, and subsequently decomposing the complex e. g. by heating, a very even and intimate distribution of metal is obtained. This procedure may be employed for impregnating other oleophyllic catalytic materials, adsorbents, etc.

In addition to their valuable properties resulting from oil-solubility, the complexes described herein are also useful in other applications. They may be employed for example to separate difficultly separable organic compounds e. g. isomers, by selective absorption or "clathration" as described in the copending application of William D. Schaeffer, Serial No. 274,647, filed March 3, 1952, now abandoned.

The complexes of this invention may be designated broadly as coordinate-bonded reaction products of metal ions, certain basic nitrogen-containing organic compounds and certain anions. They are very easily formed by merely bringing together the stoichiometric ratios of the three components, either in the presence or absence of a solvent. In some cases, though not generally, a gentle heating may be desirable to hasten the reaction. If a solvent is employed, it is preferably water, but other solvents may be employed e. g. methanol, ethanol, isopropanol, ethylene glycol, chloroform, diethyl ether, acetone, etc.

In the preferred method of preparation, a salt of the desired metal ion is first dissolved in water. The anion of this salt should be one which forms a water-soluble complex with the desired amine and metal ion. This means that the anion should not be the same as that desired in the final complex, since the desired complexes are water-insoluble. To the initial solution of metal salt, the required amount of amine is then added and the mixture is stirred until a homogeneous solution is formed. The water-soluble complex solution is then mixed with a compound which furnishes the anion desired in the final complex, e. g. thiocyanate, whereupon a water-insoluble complex precipitates out. The precipitate is then recovered, washed and dried to give the desired oil-soluble complex.

The initial salt may be a chloride, bromide, sulfate, nitrate, phosphate, acetate, or any water-soluble salt which forms water-soluble complexes with the desired amine. This selection is preferable because the amines employed herein are water-insoluble or only slightly soluble, and the formation of the initial soluble complex provides a convenient method for contacting the amine with the precipitating anion.

Suitable complexes as described herein may be prepared embodying generally any metal component having an atomic number of 13 or above. The most readily utilizable metals, and the ones of which oil-soluble compounds are most desired are those of groups I–B, II–B, VI–B, VII–B and VIII–B of the periodic table. Chromium, manganese, iron, cobalt, nickel, copper, zinc, molybdenum, silver, cadmium, palladium, tungsten, osmium, iridium, platinum, gold, mercury, and uranium are prime examples. Aluminum, tin, antimony, lead, and bismuth may also be employed.

In order to obtain oil-solubility of the above metals as coordinate complexes it is necessary to select a proper amine and a proper anion. Those amines containing an aromatic ring, i. e. one characterized by the type of bonding leading to "resonance stabilization" are preferable to non-aromatics for producing highly oil-soluble complexes. It is further preferred that the carbon atoms alpha to at least one hetero-N atom should be unsubstituted, since the alpha substituted amines, e. g. 2,6 lutidine, form complexes only with great difficulty. Examples of suitable amines include the 3- and 4-alkyl pyridines which contain more than one alkyl carbon atom, in all of which the alkyl substitution is sufficient to provide a total of more than 6 carbon atoms in the amine. Specific examples include:

4-ethyl pyridine
3-ethyl pyridine
3,4-lutidine
3,5-lutidine
2,4-lutidine
4-propyl pyridine
4-butyl pyridine
4-amyl pyridine
4-(5-nonyl) pyridine Many other amines falling within the above categories will occur to those skilled in the art.

The preferred anions which are found to give optimum oil-solubility characteristics are those containing at least three atoms which are so bonded as to permit "resonance stabilization." This group includes for example thiocyanate NCS—, isothiocyanate SCN—, azide NNN—, cyanate NCO—, isocyanate OCN—. Other anions which sometimes exhibit phenomena similar to resonance stabilization, and which may be employed herein include for example cyanide CN—, nitrate NO₃—, nitro NO₂—, nitrito ONO—, phosphate PO₄≡, arsensate AsO₄≡, arsenite AsO₃≡, molybdate MoO₄=, and similar materials.

The complexes described herein are for the most part stable crystalline materials which decompose below their melting points, giving up at relatively low temperatures a part of the complexed amine, and at higher temperatures all of the amine. They are water-insoluble, and their solubility in, for example, heptane at 28° C. ranges from about 10% to 60% by weight. They have a limited solubility in lower alcohols, but are more soluble in the higher alcohols.

Specific examples illustrating the preparation and properties of typical complexes of this invention are given below, but these examples should not be considered as limiting in scope.

*Example*

To a 20% aqueous solution containing 1 mole of nickel chloride is added approximately 4 moles of 4-(n-butyl) pyridine. The mixture is stirred at room temperature for a few minutes, whereupon the amine is dissolved to give a dark green solution. A concentrated solution containing approximately 2 moles of potassium thiocyanate is then added with stirring, whereupon a voluminous blue precipitate forms. The precipitate is removed by filtration, water washed and dried at 150° F. for 4 hours. The dry solid is then found by analysis to correspond to the formula:

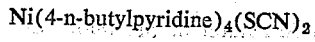
Ni(4-n-butylpyridine)₄(SCN)₂

This material is soluble to the extent of between about 10% and 50% by weight in various hydrocarbon oils. The corresponding 4-methyl pyridine complex is practically insoluble in hydrocarbons, as is the corresponding chloride complex.

By substituting equal molar proportions of soluble azides, cyanides, isocyanates, cyanates, isothiocyanates (as for example the potassium or sodium salts) for the potassium thiocyanate used in the above example, the corresponding complexes of those anions are obtained, all of which have solubility properties similar to the thiocyanate. By substituting for the nickel chloride molar equivalents of salts of any of the metal components listed above, the corresponding complex of that metal is obtained. Likewise, any of the previously described amines may be substituted for the 4-n-butyl pyridine. However, when substituting an amine, varying molar ratios thereof may be employed, for example from 1 to 6 moles per mole of metal. Many metals e. g. nickel and cobalt, form discrete complexes containing 2, 4 or 6 molecules of amine per metal atom, all of which exhibit more or less oil-solubility. Generally those complexes containing higher molar proportions of amine are most oil-soluble, and are therefore preferred.

The following complexes may be prepared by the method outlined in the above example, and by making appropriate substitutions of reactants as outlined above:

1. Nickel - tetra(4-ethylpyridine) - dithiocyanate, Ni(4-ethylpyridine)₄(SCN)₂
2. Cobalt - tetra[4-(5-nonyl)pyridine]dicyanate, Co[4-5-nonyl)pyridine]₄(OCN)₂
3. Cupric - tetra(4-amyl pyridine)₄-dithiocyanate, Cu(4-amylpyridine)₄(SCN)₂
4. Cadmium - tetra(3,5-lutidine) - dithiocyanate, Cd(3,5-lutidine)₄(SCN)₂
5. Cobalt - tetra(3,4-lutidine)-molybdate, Co(3,4-lutidine)₄(MoO₄)
6. Cobalt - tetra(4-ethylpyridine)-dithiocyanate, Co(4-ethylpyridine)₄(SCN)₂
7. Ferrous-tetra(3-n-butyl pyridine)-dithiocyanate, Fe(3-n-butyl pyridine)₄(SCN)₂

All of the above compounds exhibit considerable solubility in hydrocarbons and other non-polar solvents. The nickel, cobalt, iron, chromium and molybdenum complexes shown are particularly useful for catalyst impregnation from anhydrous media. The manganese, cobalt, and iron complexes are particularly useful as oxidation accelerators in e. g. paints.

If it is desired to utilize any of the complexes described herein as insecticides, it is preferable to apply them in oil solution, as for example a 1% to 20% solution in kerosene or crude oil. The oil solution may in turn be further diluted by emulsifying in water with the aid of an emulsifier e. g. alkali metal or amine soaps of fatty acids.

The above disclosure is not intended as a complete and detailed description of all the individual complexes and uses therefore which are embraced within the broad inventive concept. Other specific complexes, methods of preparation and uses will readily occur to those skilled in the art. The true scope of the invention is intended to be embraced by the following claims:

We claim:

1. A method for preparing a hydrocarbon solution of a metal of atomic number 25–29 inclusive which comprises complexing a salt of said metal with four mole-equivalents of an alkyl-pyridine base to form a tetra-coordinated Werner complex, then dissolving said Werner complex in said hydrocarbon oil, said alkyl pyridine base containing at least 2 and not more than 9 alkyl carbon atoms, all of said alkyl carbon atoms being in the form of alkyl groups attached to the ring in positions non-adjacent to the hetero-N atom.

2. A method as defined in claim 1 wherein the anion of said metal salt is selected from the group consisting of thiocyanate, isothiocyanate, cyanate, isocyanate and azide.

3. An oil-soluble Werner complex consisting of a thiocyanate of a metal of atomic number 25–29 inclusive coordinated with four mole-equivalents of an alkyl-pyridine base, said alkyl pyridine base containing at least 2 and not more than 9 alkyl carbon atoms, all of said alkyl carbon atoms being in the form of alkyl groups attached to the ring in positions non-adjacent to the hetero-N atom.

4. A method for preparing an oil-soluble, water-insoluble Werner complex, said Werner complex being composed of one mole-equivalent of a thiocyanate salt of a metal of atomic number 25–29 inclusive coordinated with four mole-equivalents of a water-insoluble alkyl-pyridine base, said alkyl pyridine base containing at least 2 and not more than 9 alkyl carbon atoms, all of said alkyl carbon atoms being in the form of alkyl groups attached to the ring in positions non-adjacent to the hetero-N atom, which comprises first forming an aqueous solution of a soluble salt of the above metal, the anion of said soluble salt being selected from the group consisting of chloride, bromide, sulfate, nitrate, phosphate and acetate, adding thereto four mole-proportions of said pyridine base to form a water-soluble Werner complex, then adding to the resulting solution two mole-proportions of an alkali metal thiocyanate, thereby precipitating said oil-soluble, water-insoluble Werner complex, and recovering the solid complex.

(References on following page).

References Cited in the file of this patent

UNITED STATES PATENTS

| | | |
|---|---|---|
| 2,054,490 | Stusser | Sept. 15, 1936 |
| 2,426,586 | Beber | Sept. 2, 1947 |
| 2,437,645 | Long et al. | Mar. 9, 1948 |
| 2,466,925 | Brauner | Apr. 12, 1949 |
| 2,476,514 | Smith | July 19, 1949 |
| 2,554,182 | Franz | May 22, 1951 |

FOREIGN PATENTS

| | | |
|---|---|---|
| 234,772 | Great Britain | Mar. 8, 1926 |
| 343,569 | Great Britain | Feb. 23, 1931 |
| 388,374 | Great Britain | Feb. 20, 1933 |

OTHER REFERENCES

Beilstein's Handbuch der Organischen Chemie Vierte Auflage, Band XX Seite 236 Verlag, 1935.